(12) United States Patent
Webster

(10) Patent No.: US 10,006,549 B2
(45) Date of Patent: Jun. 26, 2018

(54) VALVE

(75) Inventor: John R. Webster, Derby (GB)

(73) Assignee: ROLLS-ROYCE plc, London (GB)

( * ) Notice: Subject to any disclaimer, the term of this patent is extended or adjusted under 35 U.S.C. 154(b) by 568 days.

(21) Appl. No.: 13/129,734

(22) PCT Filed: Sep. 8, 2009

(86) PCT No.: PCT/EP2009/006491
§ 371 (c)(1),
(2), (4) Date: May 17, 2011

(87) PCT Pub. No.: WO2010/063334
PCT Pub. Date: Jun. 10, 2010

(65) Prior Publication Data
US 2011/0233434 A1    Sep. 29, 2011

(30) Foreign Application Priority Data

Dec. 5, 2008 (GB) .................................. 0822163.2

(51) Int. Cl.
*F16K 1/36* (2006.01)
*F16K 1/42* (2006.01)
*F16K 31/00* (2006.01)

(52) U.S. Cl.
CPC .................. *F16K 1/36* (2013.01); *F16K 1/42* (2013.01); *F16K 31/003* (2013.01)

(58) Field of Classification Search
CPC . F16K 1/36; F16K 1/42; F16K 31/003; F16K 31/004
USPC ............ 251/129.06, 159, 170–176, 333, 334
See application file for complete search history.

(56) References Cited

U.S. PATENT DOCUMENTS

| | | | | |
|---|---|---|---|---|
| 3,572,735 A | * | 3/1971 | Dryer | 277/637 |
| 4,387,878 A | * | 6/1983 | Zukausky | 251/30.03 |
| 4,915,354 A | * | 4/1990 | Sims et al. | 251/334 |
| 4,955,581 A | * | 9/1990 | Dukas, Jr. | 251/214 |
| 5,265,841 A | * | 11/1993 | Abrahamsen et al. | 251/75 |
| 5,343,894 A | * | 9/1994 | Frisch et al. | 137/625.65 |
| 5,368,060 A | * | 11/1994 | Worrall et al. | 137/15.18 |
| 6,062,532 A | * | 5/2000 | Gurich et al. | 251/57 |
| 6,230,731 B1 | | 5/2001 | Miller et al. | |

(Continued)

FOREIGN PATENT DOCUMENTS

| | | |
|---|---|---|
| FR | 2 907 872 A1 | 5/2008 |
| WO | WO 96/17192 A1 | 6/1996 |
| WO | WO 98/37343 A2 | 8/1998 |

(Continued)

OTHER PUBLICATIONS

British Search Report issued in Application No. 0822163.2; dated Feb. 15, 2009.

(Continued)

*Primary Examiner* — Jessica Cahill
*Assistant Examiner* — Daphne M Barry
(74) *Attorney, Agent, or Firm* — Oliff PLC

(57) ABSTRACT

A valve arrangement including a valve body and a valve seat each having an opposed surface, the valve arrangement also includes a high-frequency cyclic actuator to move the valve body with respect to the valve seat to bring the opposed surfaces into and out of abutment, characterised in that the opposed surface of at least one of the valve body and the valve seat includes a resiliently displaceable surface.

11 Claims, 3 Drawing Sheets

(56) References Cited

U.S. PATENT DOCUMENTS

| | | |
|---|---|---|
| 6,619,322 B1 | 9/2003 | Wojciechowski et al. |
| 2001/0047828 A1 | 12/2001 | Berger et al. |

FOREIGN PATENT DOCUMENTS

| | | |
|---|---|---|
| WO | WO 2005/038320 A2 | 4/2005 |
| WO | WO 2008/005838 A2 | 1/2008 |

OTHER PUBLICATIONS

Written Opinion of the International Searching Authority issued in Application No. PCT/EP2009/006491; dated Dec. 8, 2009.
International Search Report issued in Application No. PCT/EP2009/006491; dated Dec. 8, 2009.

* cited by examiner

VALVE

The present invention relates to a self-resetting displacement valve and is particularly, though not exclusively, pertinent to high frequency, small displacement valves.

Piezoelectric valves are used in applications where high frequency actuation is required, such as modulated pressure control and engine injection systems. These valves may find particular utility in a gas turbine engine 10. A piezoelectric valve may, in its simplest form, be used to move a valve body into and out of contact with a valve seat to close and open a port to fluid flow as shown in FIG. 1. This shows a piezoelectric valve 34 comprising a piezoelectric element 36 in operative association with a valve body 38 that moves in the direction of the arrows 40 to close and open a port 42 in a fluid conduit 44 to restrict or permit fluid flow therethrough.

However, one disadvantage of piezoelectric valves is that the displacement is very limited, typically just a few micrometres. Although mechanical amplification can be used to increase the displacement this generally results in a requirement for larger piezoelectric elements 36 and/or lower resultant forces being transferred to the valve body 38 and lower reliability of the valves 34.

Another disadvantage of conventional piezoelectric valves 34 is that the "zero" position, usually fully open or fully closed, is subject to drift caused by thermal expansion and wear. Since a piezoelectric valve 34 has very limited displacement this may lead to movement of the zero position so that the valve does not fully open and/or fully close, or its mechanical position no longer matches its control signal. Typically this drift will have consequent effects on valve control systems and components that rely on the fluid flow controlled by the piezoelectric valve.

A further disadvantage of the conventional piezoelectric valve 34 is the cost of manufacture. Accurate control of the dimensions is required to achieve accurate and reliable operation.

Thus the present invention seeks to provide a valve that seeks to address the aforementioned problems.

Accordingly the present invention provides a valve arrangement comprising a valve body and a valve seat each having an opposed surface, the valve arrangement also comprising a cyclic actuator to move the valve body with respect to the valve seat to bring the opposed surfaces into and out of abutment, characterised in that the opposed surface of at least one of the valve body and the valve seat comprises a resiliently displaceable surface. This provides the advantage that a zero position of the valve is reset each time the valve body and valve seat are brought into abutment.

The resiliently displaceable surface may be connected to resilient biasing means to bias it towards the other opposed surface or to bias it away from the other opposed surface.

The resiliently displaceable surface may be connected to damping means.

The actuator may be a piezoelectric actuator, a magnetostrictive actuator, an electromagnetic actuator, a magnetic shape memory actuator, a thermal actuator or a mechanical actuator.

The valve seat may comprise a compressible material, which may be a viscoelastic material. This acts as the displaceable surface, the resilient biasing means and the damping means.

The biasing means may comprise a spring or a conical washer. The damping means may comprise hydraulic or pneumatic pressure. The valve seat may comprise a conical washer and the damping means comprise working fluid flow underneath the conical washer. The valve seat may be connected to a conical washer and the damping means comprise working fluid flow underneath the conical washer.

The present invention will be more fully described by way of example with reference to the accompanying drawings, in which.

Figure 1:
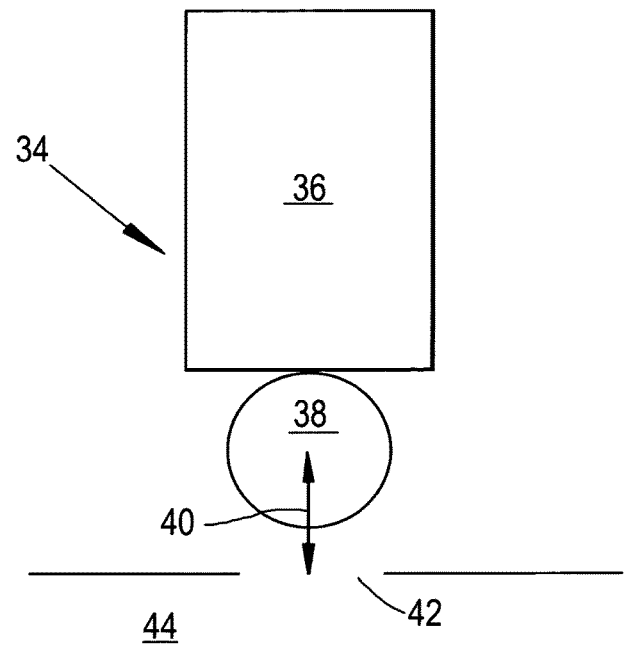
FIG. 1 is a schematic view of a prior art valve.
Figure 2:
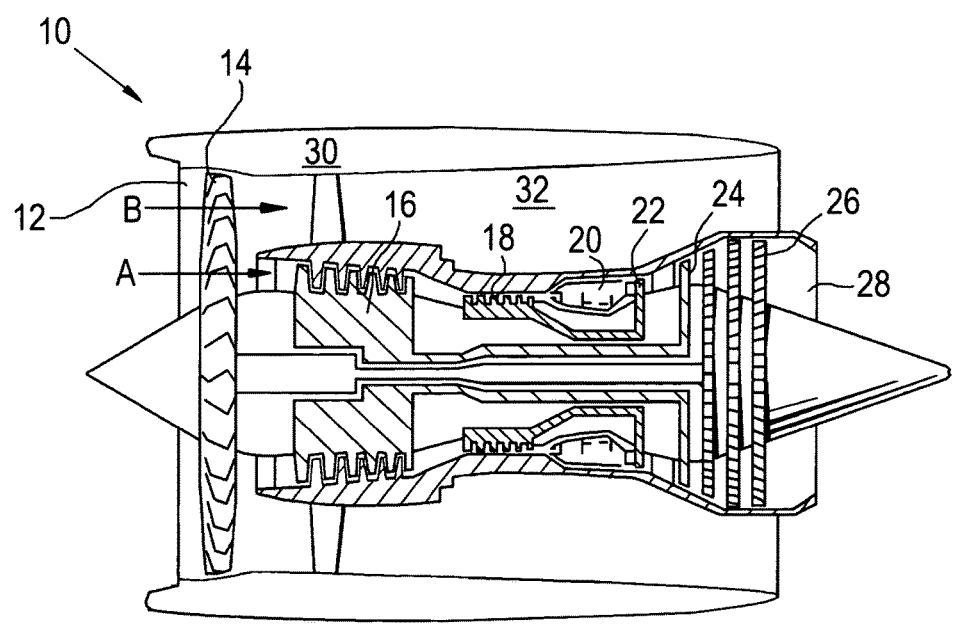
FIG. 2 is a sectional side view of a gas turbine engine.

A gas turbine engine 10 is shown in FIG. 2 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. A piezoelectric valve 46 according to the present invention may be used to control flow of fluid as an alternative to less reliable valves such as solenoid valves, especially for use as servo valves. Applications of the piezoelectric valve 46 according to the present invention include bleed valves, tip clearance control and case cooling.

Figure 3:
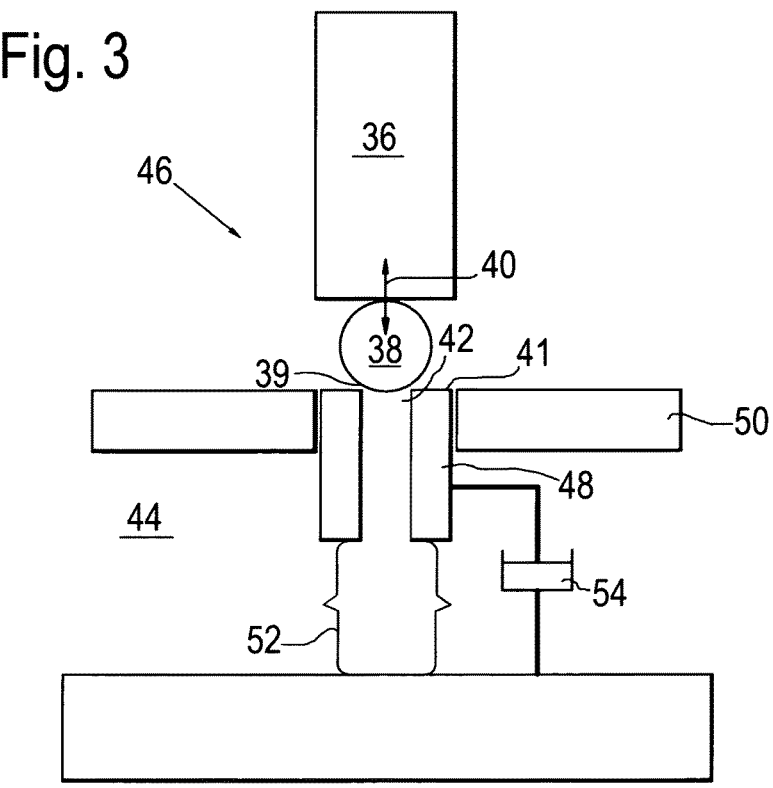
FIG. 3 is a schematic view of a valve according to the present invention.

An exemplary, first embodiment of the piezoelectric valve 46 of the present invention is shown in FIG. 3 and comprises a piezoelectric element 36 in operative association with a valve body 38 in the form of a conical plug, a spherical ball, a flanged configuration etc. The piezoelectric element 36 actuates the valve body 38 in the directions of arrows 40 to open and close a port 42 in a fluid conduit 44. The valve 46 differs from the valve 34 of the prior art in the provision of a valve seat 48 that is positioned in the port 42 of the fluid conduit 44. The valve body 38 has a surface 39, or a part of its outer surface, that opposes a surface 41 of the valve seat 48. The opposed surfaces 39, 41 may be suitably shaped to more closely complement each other to better seal the port 42.

The valve seat 48 and valve body 38 are arranged so that the valve 46 is closed, at the "zero" position, when the surface 41 of the valve seat 48 is approximately aligned with the outer surface of the upper wall 50 of the fluid conduit 44. Alternatively the zero position may be at another distance from the outer surface of the upper wall 50 (vertical as shown in FIG. 3) as required by the specific application. The valve seat 48 is not rigidly positioned with respect to the upper wall 50 of the fluid conduit 44. Instead it is able to move linearly, vertically in this example, within a defined range from the zero position towards an open position. There may be a range of positions in which the valve 46 is closed but the zero position has not been reached, as will be discussed in greater detail with respect to FIG. 4. Similarly, the valve 46 is open as soon as the valve body 38 moves so that it no longer abuts the valve seat 48. There is thence a range of positions of both the valve body 38 and valve seat 48 in which the valve 46 is open but the valve seat 48 has not reached its open position. Indeed, the valve seat 48 is connected to biasing means, spring 52, that biases the valve seat 48 towards its "open" position, a position which further closes the gap between the valve body 38 and the valve seat 48, vertically above in this example. This means that each time the valve body 38 is displaced, downwards in this example, by the piezoelectric element 36 it pushes the valve seat 48 downwards and resets the zero position.

The biasing means, spring 52, acts to push the seat 48 back towards the valve body 38, upwards in this example, once the valve body 38 is displaced by the piezoelectric actuator 36 to open the valve 46. However, the spring 52 is arranged to have a longer time constant for its displacement so that it moves the valve seat 48 more slowly than the valve body 38. Thus the valve seat 48 does not reach its open position before the valve body 38 abuts it and pushes it back to the zero position. Optionally the movement of the valve seat 48 may be damped by damping means 54. Preferably the damping means 54 comprises an asymmetric damper so that there is little resistance to downward movement of the valve seat 48 but the upward motion is resisted. The spring 52 may be any element providing a stiffness and a spring force such as a coil spring, a conical spring or a plurality of leaf springs spaced apart to allow fluid flow therebetween.

Figure 4:
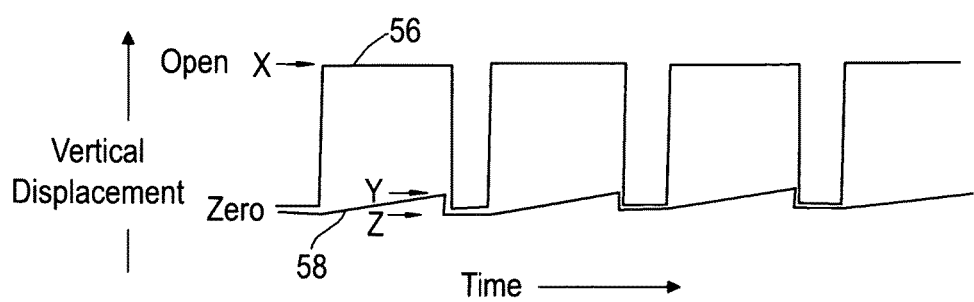
FIG. 4 is a plot showing the time response of a valve body and a valve seat of the present invention.

The valve arrangement of the present invention is particularly suited to a valve 46 having a valve body 38 that moves between two discrete positions, open and closed, such as a pulse width modulated valve. The relative time responses are shown in FIG. 4 in which line 56 shows the time response of the valve body 38 and line 58 shows the time response of the valve seat 48. Line 56 alternates between the discrete open and closed positions of the valve body 38 whereas line 58 shows that the position of the valve seat 48 is reset by the closed position of the valve body 38 to its lowest, zero position and then gradually moves towards its open position whilst the valve body 38 is in its open position. The rate of increase of line 58 is determined by the time constant effects of the biasing means, spring 52, alone or the biasing means, spring 52, and the damping means 54 together. At point X the valve 46 is open and the valve body 38 is spaced from the valve seat 48 by its maximum distance. At point Y the valve body 38 just abuts the valve seat 48 and is still to be displaced further by the piezoelectric actuator 36 to the closed position. At point Z the valve 46 is at its zero position. After a short time interval at the zero position the piezoelectric actuator 36 moves the valve body 38 into its open position and the cycle repeats.

Figure 5:
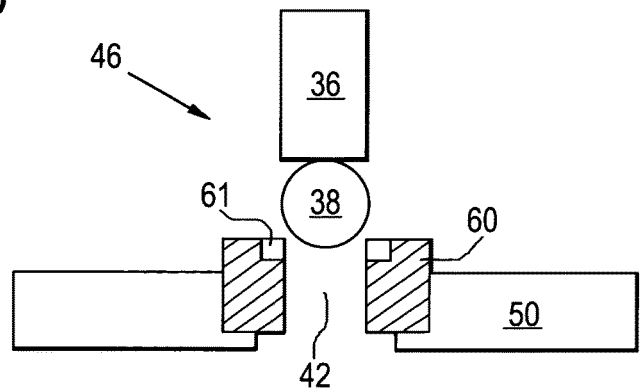
FIG. 5 is a schematic view of a second embodiment of a valve according to the present invention.

A second embodiment of the present invention is shown in FIG. 5 in which the valve seat 48, biasing means, spring 52, and damping means 54 of the first embodiment are replaced by a compliant valve seat member 60. Preferably this compliant valve seat member 60 comprises a resiliently compressible material having damping characteristics such that it is compressed by the movement of the valve body 38, downwards in this example, and then starts to regain its uncompressed shape whilst the valve body 38 is in its open position. The decompression takes place with a longer time constant than that exhibited by the valve body 38 movement actuated by the piezoelectric element 36. A suitable material for the compliant valve seat member 60 is a viscoelastic material, for example Sorbothane™, but other materials having the required properties may be substituted with equal felicity. The valve seat 60 in this embodiment may comprise either the whole of member 60 or just the area 61 that the valve body 38 abuts in use.

Figure 6:
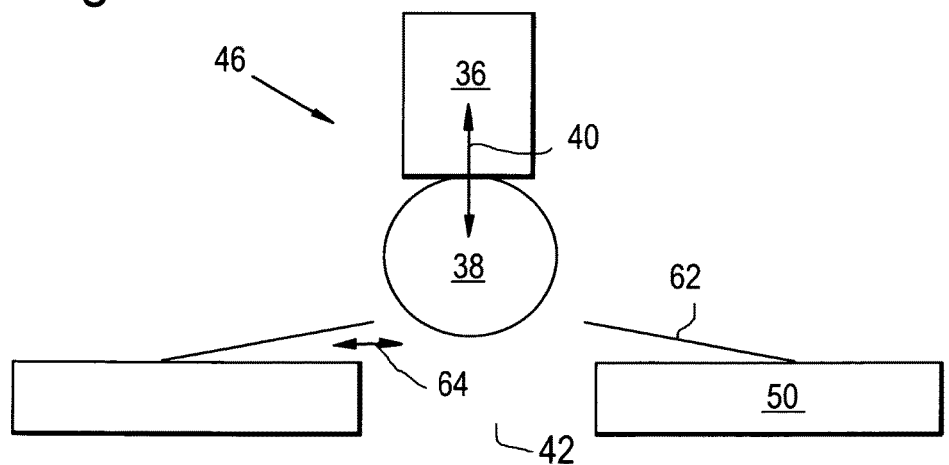
FIG. 6 is a schematic view of a third embodiment of a valve according to the present invention.

A third embodiment of the present invention is shown in FIG. 6 in which the valve seat 48, spring 52 and damping means 54 of the first embodiment are replaced by a compliant conical, Belville, washer 62. In this embodiment the working fluid that flows through the fluid conduit 44 and through the port 42 when the valve 46 is open, provides the damping. When the valve 46 is open the working fluid flows into the space between the conical washer 62 and the upper wall 50 of the fluid conduit 44. When the valve body 38 moves to close the valve 46 it deforms the conical washer 62 and expels the working fluid, as shown by arrows 64. Optionally, the conical washer 62 may be shaped to promote the expulsion of the working fluid and inhibit ingress of the fluid to provide asymmetric damping. Thus this third embodiment of the present invention provides hydraulic or pneumatic damping using the working fluid.

Figure 7:
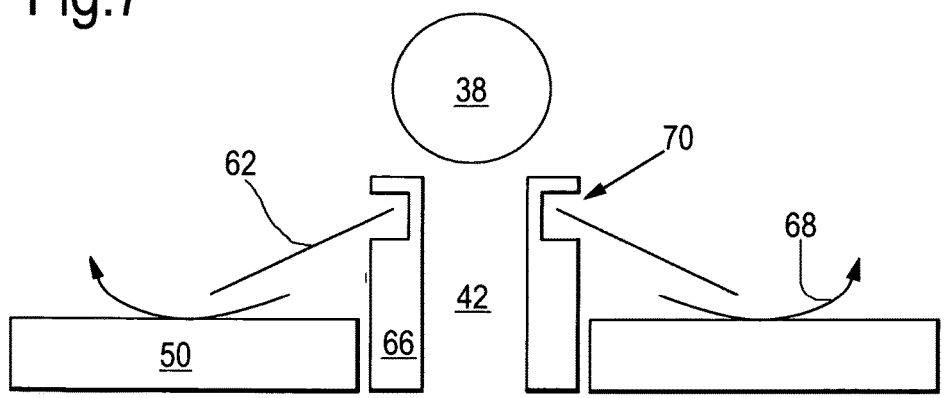
FIG. 7 is a schematic view of a fourth embodiment of a valve according to the present invention.

The fourth embodiment of the present invention, shown in FIG. 7, is a refinement of the third embodiment and comprises a valve seat 66 connected to the conical washer 62. The connection may be by the radially inner end of the conical washer 62 locating in a circumferentially extending groove 70 in the valve seat 66. The radially outer end of the conical washer 62 may abut the outer surface of the upper wall 50 of the fluid conduit 44 or may abut spacers located thereon. When the valve body 38 is displaced away from the piezoelectric actuator 36 it abuts the valve seat 66 and pushes it to the zero position, rather than abutting the conical washer 62 as in the third embodiment (FIG. 6). The conical washer 62 is deformed by this movement and working fluid is expelled, as illustrated by arrows 68, to provide hydraulic or pneumatic damping. The conical washer 62 provides the restoring force that moves the valve seat 66 upwards whilst the valve body 38 is in its open position.

The present invention provides various improvements over the valves of the prior art including lower manufacturing costs since the required accuracy of the parts and assembly are relaxed and thermal expansion considerations are less important. The valve of the present invention also has improved life since the impact of the body 38 on the valve seat 48 is reduced or softened. The automatic resetting of the zero position increases the accuracy of the valve and prevents that accuracy deteriorating over time with wear or thermal expansion. Thermal stability is increased since differential thermal expansion of the parts of the valve 46 is accommodated by the resetting of the zero position of the valve 46 each cycle.

Although the valve seat 48, 60 has been described as compliant or is associated with a compliant member such as the conical washer 62, in the alternative the valve body 38, or the associated drive mechanism, piezoelectric element 36, may be compliant and the valve seat fixed and rigid. This allows other design constraints to be accommodated, such as available space and pressure distribution.

The damping could be provided using for example friction, magnetic or electromagnetic effects, shunted piezoelectric or other physical effects causing a hysteretic effect on the movement of the valve seat 48 relative to the valve body 38.

Although a two-state discrete valve has been described, such as a pulse width modulated valve, the present invention may be equally applied to a proportional valve using a similar arrangement to that described hereinbefore, provided that the valve is closed with sufficient frequency to reset the zero position. This may be achieved by providing a periodic pulse to specifically close the valve.

Alternatively, the arrangement of the present invention may be used for other valves where small displacement is required and/or where the exact closed position may be indeterminate through various factors. One example of such a valve uses a magnetostrictive actuator instead of a piezoelectric actuator element, for example in a fuel injector for a gas turbine engine. In this application the magnetostrictive element replaces the piezoelectric element 36 in any of the preceding embodiments.

The piezoelectric actuator and magnetostrictive actuator are high-frequency cyclic actuators. Other high-frequency cyclic actuators may thus be substituted with equal felicity, such as mechanical, electromagnetic, magnetic shape memory or thermal expansion actuators.

Although embodiments of the present invention have been described in which the zero position is set at the closed position of the valve, other embodiments lie within the scope of the present invention that have the zero position at the open position. This requires the biasing means, for example spring 52, to pull the valve seat 48 away from the piezoelectric element 36 rather than pushing the seat 48 towards it. An end stop will be required to limit the extent of the movement, which may be fluid permeable.

The invention claimed is:

1. A valve arrangement, comprising:
   a valve body and a valve seat, each having an opposed surface, the opposed surface of at least one of the valve body and the valve seat including a resiliently displaceable surface that defines a time constant; and
   a high-frequency cyclic actuator to move the valve body with respect to the valve seat to bring the opposed surfaces into and out of abutment, wherein
      a period of oscillations of the high-frequency cyclic actuator is shorter than the time constant of the resiliently displaceable surface,
      a displacement of the high-frequency cyclic actuator and a displacement of the valve body are operatively associated,
      the actuator is a piezoelectric actuator, and
      the displaceable surface comprises a compressible material.

2. A valve arrangement as claimed in claim 1 wherein the resiliently displaceable surface is connected to resilient biasing means to bias it towards the other opposed surface.

3. A valve arrangement as claimed in claim 2 wherein the biasing means comprises a spring.

4. A valve arrangement as claimed in claim 2 wherein the biasing means comprises a conical washer.

5. A valve arrangement as claimed in claim 1 wherein the resiliently displaceable surface is connected to resilient biasing means to bias it away from the other opposed surface.

6. A valve arrangement as claimed in claim 1 wherein the resiliently displaceable surface is connected to damping means.

7. A valve arrangement as claimed in claim 6 wherein the damping means comprises hydraulic or pneumatic pressure.

8. A valve arrangement as claimed in claim 7 wherein the valve seat comprises a conical washer and the damping means comprises working fluid flow underneath the conical washer.

9. A valve arrangement as claimed in claim 7 wherein the valve seat is connected to a conical washer and the damping means comprises working fluid flow underneath the conical washer.

10. A valve arrangement as claimed in claim 1 wherein the valve seat comprises a compressible material.

11. A valve arrangement as claimed in claim 10 wherein the compressible material comprises a viscoelastic material.

* * * * *